(12) United States Patent
Schloss

(10) Patent No.: US 11,178,107 B2
(45) Date of Patent: Nov. 16, 2021

(54) SYSTEM AND METHOD FOR DETECTING SURREPTITIOUS PACKET REROUTING

(71) Applicant: Michael Schloss, Silver Spring, MD (US)

(72) Inventor: Michael Schloss, Silver Spring, MD (US)

(*) Notice: Subject to any disclaimer, the term of this patent is extended or adjusted under 35 U.S.C. 154(b) by 122 days.

(21) Appl. No.: 16/587,679

(22) Filed: Sep. 30, 2019

(65) Prior Publication Data

US 2021/0099426 A1    Apr. 1, 2021

(51) Int. Cl.
*H04L 29/06* (2006.01)
*H04L 29/12* (2006.01)
*H04L 12/823* (2013.01)
*H04L 12/26* (2006.01)

(52) U.S. Cl.
CPC ...... *H04L 63/0236* (2013.01); *H04L 43/0864* (2013.01); *H04L 47/32* (2013.01); *H04L 61/2007* (2013.01); *H04L 63/1425* (2013.01); *H04L 69/16* (2013.01); *H04L 61/256* (2013.01)

(58) Field of Classification Search
CPC ..... H04L 63/0236; H04L 12/56; H04L 43/10; H04L 67/1025; H04L 43/106; G06F 16/2322; G06F 2201/835; G06F 8/355
USPC .......................................................... 726/13
See application file for complete search history.

(56) References Cited

U.S. PATENT DOCUMENTS

| | | | | |
|---|---|---|---|---|
| 5,790,554 A * | 8/1998 | Pitcher | ............... | H04L 12/5601 370/389 |
| 6,240,444 B1 * | 5/2001 | Fin | ......................... | H04L 29/06 709/205 |
| 6,324,161 B1 * | 11/2001 | Kirch | ................. | H04L 41/0659 370/217 |
| 6,381,638 B1 * | 4/2002 | Mahler | ............ | H04L 29/12009 370/355 |
| 6,735,631 B1 * | 5/2004 | Oehrke | ................... | H04L 41/12 709/201 |
| 6,826,172 B1 * | 11/2004 | Augart | .................... | H04L 45/20 370/351 |
| 7,337,206 B1 * | 2/2008 | Wen | ....................... | H04L 43/00 370/235 |
| 7,385,924 B1 * | 6/2008 | Riddle | ............... | H04L 41/5022 370/235 |
| 7,433,943 B1 * | 10/2008 | Ford | .................. | H04L 41/5009 370/235 |

(Continued)

FOREIGN PATENT DOCUMENTS

| | | | | |
|---|---|---|---|---|
| AU | 2004214573 B9 * | 7/2008 | ............ | H04L 41/22 |
| EP | 1133864 B1 * | 9/2005 | ........ | H04L 67/1006 |

(Continued)

OTHER PUBLICATIONS

Cloudflare, "What is round-trip time? RTT definition", 2021 (Year: 2021).*

(Continued)

*Primary Examiner* — Ondrej C Vostal
(74) *Attorney, Agent, or Firm* — Butzel Long

(57) ABSTRACT

Systems and methods of detecting network traffic tampering by monitoring the network traffic for network packets that arrive outside of an allowable error band and rejecting those packets for which transit times are outside the control limits due to possible tampering are provided.

20 Claims, 5 Drawing Sheets

(56) References Cited

U.S. PATENT DOCUMENTS

| | | | | |
|---|---|---|---|---|
| 7,480,707 | B2* | 1/2009 | Morlitz | H04L 29/06 709/223 |
| 7,496,661 | B1* | 2/2009 | Morford | H04L 41/5025 709/224 |
| 7,568,224 | B1* | 7/2009 | Jennings | H04L 63/126 713/161 |
| 7,653,938 | B1* | 1/2010 | Touitou | H04L 63/123 726/14 |
| 7,657,618 | B1* | 2/2010 | Rothstein | H04L 67/1017 709/223 |
| 7,673,032 | B1* | 3/2010 | Augart | H04L 45/26 709/223 |
| 8,161,555 | B2* | 4/2012 | Spatscheck | H04L 63/1458 726/23 |
| 8,289,845 | B1* | 10/2012 | Baldonado | H04L 43/16 370/230 |
| 8,451,711 | B1* | 5/2013 | O'Toole, Jr. | H04L 69/16 370/216 |
| 8,812,876 | B1* | 8/2014 | Ginzton | G06F 12/1408 713/193 |
| 9,002,634 | B1* | 4/2015 | Kalyanasundaram | H04W 40/36 701/420 |
| 9,032,092 | B1* | 5/2015 | Sinn | H04L 61/00 709/238 |
| 9,154,394 | B2* | 10/2015 | Ko | H04L 43/0858 |
| 9,208,323 | B1* | 12/2015 | Karta | G06F 21/577 |
| 9,363,281 | B1* | 6/2016 | Allen | H04L 63/1408 |
| 9,531,736 | B1* | 12/2016 | Torres | H04L 63/1441 |
| 9,680,951 | B1* | 6/2017 | Graham-Cumming | H04L 9/12 |
| 10,630,596 | B1* | 4/2020 | Volpe | H04L 49/3063 |
| 10,873,533 | B1* | 12/2020 | Ismailsheriff | H04L 47/2441 |
| 2002/0051464 | A1* | 5/2002 | Sin | H04L 47/283 370/466 |
| 2002/0174216 | A1* | 11/2002 | Shorey | H04L 43/00 709/224 |
| 2003/0016664 | A1* | 1/2003 | MeLampy | H04L 47/2416 370/389 |
| 2003/0048793 | A1* | 3/2003 | Pochon | H04L 41/12 370/401 |
| 2003/0161310 | A1* | 8/2003 | Dobbins | H04L 29/06027 370/392 |
| 2004/0073655 | A1* | 4/2004 | Kan | H04L 41/5009 709/224 |
| 2006/0031476 | A1* | 2/2006 | Mathes | H04L 41/0886 709/224 |
| 2006/0068818 | A1* | 3/2006 | Leitersdorf | H04M 3/4872 455/466 |
| 2007/0019640 | A1* | 1/2007 | Thiede | H04L 43/065 370/389 |
| 2007/0140128 | A1* | 6/2007 | Klinker | H04L 45/306 370/238 |
| 2007/0204341 | A1* | 8/2007 | Rand | G06Q 10/107 726/22 |
| 2008/0104182 | A1* | 5/2008 | Jimmei | H04L 63/1458 709/206 |
| 2008/0181226 | A1* | 7/2008 | Varier | H04L 45/586 370/390 |
| 2009/0310500 | A1* | 12/2009 | Matsuda | H04L 43/0864 370/252 |
| 2010/0008249 | A1* | 1/2010 | Fukuyama | H04L 12/56 370/252 |
| 2010/0128604 | A1* | 5/2010 | Appleby | H04L 65/602 370/230 |
| 2010/0265835 | A1* | 10/2010 | Haley | H04L 43/0852 370/252 |
| 2010/0333188 | A1* | 12/2010 | Politowicz | H04L 63/1441 726/13 |
| 2011/0261811 | A1* | 10/2011 | Battestilli | H04L 67/1025 370/389 |
| 2012/0079101 | A1* | 3/2012 | Muppala | H04L 63/1425 709/224 |
| 2012/0203926 | A1* | 8/2012 | Camp | H04L 61/6013 709/238 |
| 2012/0290105 | A1* | 11/2012 | Balint | G05B 19/4185 700/73 |
| 2012/0331032 | A1* | 12/2012 | Balachandran | H04L 69/164 709/202 |
| 2013/0096904 | A1* | 4/2013 | Hui | H04N 21/6131 703/21 |
| 2014/0043999 | A1* | 2/2014 | Bugenhagen | H04W 24/02 370/252 |
| 2014/0211625 | A1* | 7/2014 | White | H04N 21/64792 370/235 |
| 2015/0058983 | A1* | 2/2015 | Zeitlin | H04L 63/1408 726/23 |
| 2015/0098465 | A1* | 4/2015 | Caputo, II | H04L 45/7453 370/389 |
| 2015/0188949 | A1* | 7/2015 | Mahaffey | H04W 12/37 726/1 |
| 2015/0281028 | A1* | 10/2015 | Akhter | H04L 43/0858 370/252 |
| 2015/0295856 | A1* | 10/2015 | Karthikeyan | H04L 47/822 370/230 |
| 2015/0319049 | A1* | 11/2015 | Nachum | H04L 41/14 370/422 |
| 2016/0072689 | A1* | 3/2016 | Aldana | H04W 4/023 370/252 |
| 2016/0134723 | A1* | 5/2016 | Gupta | H04L 67/2828 709/247 |
| 2016/0359712 | A1* | 12/2016 | Alizadeh Attar | H04L 43/0864 |
| 2016/0380860 | A1* | 12/2016 | Singhal | H04L 43/0864 709/224 |
| 2017/0104630 | A1* | 4/2017 | Shelton | H04L 43/08 |
| 2017/0195209 | A1* | 7/2017 | Singh | H04L 43/10 |
| 2017/0264665 | A1* | 9/2017 | Stevens | H04L 65/80 |
| 2018/0035404 | A1* | 2/2018 | Akopian | H04L 1/1685 |
| 2018/0091939 | A1* | 3/2018 | Venkatraman | H04W 4/021 |
| 2018/0145986 | A1* | 5/2018 | Chien | H04L 63/0236 |
| 2018/0212989 | A1* | 7/2018 | Mavani | H04L 63/1433 |
| 2018/0343182 | A1* | 11/2018 | Leitner | H04L 43/18 |
| 2018/0359747 | A1* | 12/2018 | Yang | H04W 72/1268 |
| 2019/0297503 | A1* | 9/2019 | Traynor | H04M 3/2281 |
| 2020/0120009 | A1* | 4/2020 | Im | H04L 43/0864 |
| 2021/0006579 | A1* | 1/2021 | Correa Bahnsen | H04L 41/16 |

FOREIGN PATENT DOCUMENTS

| | | | | |
|---|---|---|---|---|
| EP | 1347621 | B1* | 12/2005 | H04L 45/54 |
| JP | 5271247 | B2* | 8/2013 | H04L 45/70 |
| KR | 100608136 | B1* | 8/2006 | H04L 69/16 |
| WO | WO-2004043014 | A2* | 5/2004 | H04W 76/12 |
| WO | WO-2004056047 | A1* | 7/2004 | H04L 45/70 |
| WO | WO-2005053265 | A1* | 6/2005 | H04L 29/06 |
| WO | WO-2005093576 | A1* | 10/2005 | H04L 43/18 |
| WO | WO-2016175131 | A1* | 11/2016 | H04L 63/1425 |
| WO | WO-2017015462 | A1* | 1/2017 | H04L 43/0852 |

OTHER PUBLICATIONS

Fontugne et al., "An Empirical Mixture Model for Large-Scale RTT Measurements", 2015 (Year: 2015).*

Pathak et al., "A Measurement Study of Internet Delay Asymmetry", 2008 (Year: 2008).*

Wikipedia, "Round-trip delay", 2021 (Year: 2021).*

Briscoe et al., "Reducing Internet Latency: A Survey of Techniques and Their Merits", 2016 (Year: 2016).*

Chen et al., "Secure and Efficient Software-based Attestation for Industrial Control Devices with ARM Processors", 2017 (Year: 2017).*

Ghazali et al., "Layered Multicast: A Study of Loss Event Rate Estimation in a Low Level of Statistical Multiplexing", 2005 (Year: 2005).*

Merriam-Webster, "surreptitious", 2021 (Year: 2021).*

(56) References Cited

OTHER PUBLICATIONS

McGuire et al., "Method and apparatus for the assessment and optimization of network traffic", WO2002033895A2, 2002 (Year: 2002).*
MDN Web Docs, "Redirections in HTTP", 2021 (Year: 2021).*
StormIT, "Why is RTT in networking important?", 2021 (Year: 2021).*
TechTarget, "round-trip time (RTT)", 2021 (Year: 2021).*
Wikipedia, "URL redirection", 2021 (Year: 2021).*
Weaver et al., "Detecting Forged TCP Reset Packets", 15 pages.
Zmijewski, Earl "The End of Undetected BGP Route Hijacking", May 19, 2014, Renesys Corporation, 34 pages.
Schlamp et al., "HEAP: Reliable Assessment of BGP Hijacking Attacks", Jul. 1, 2016, 13 pages.

* cited by examiner

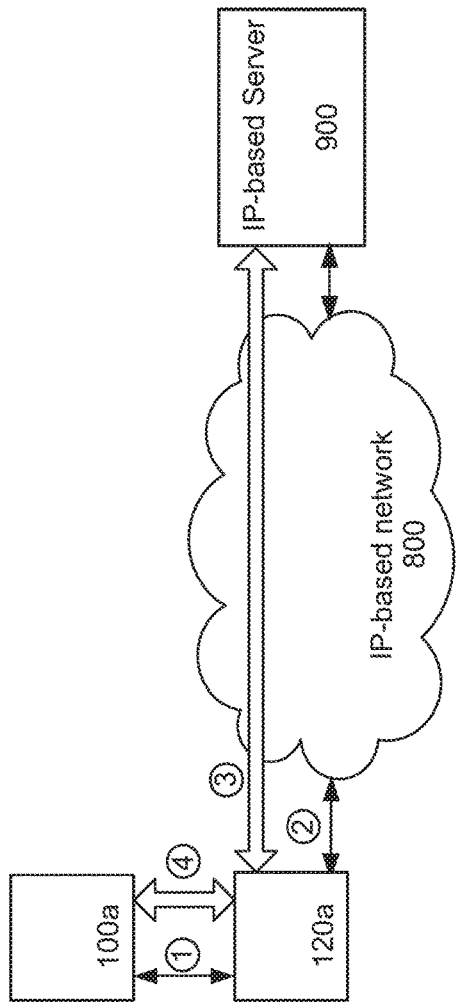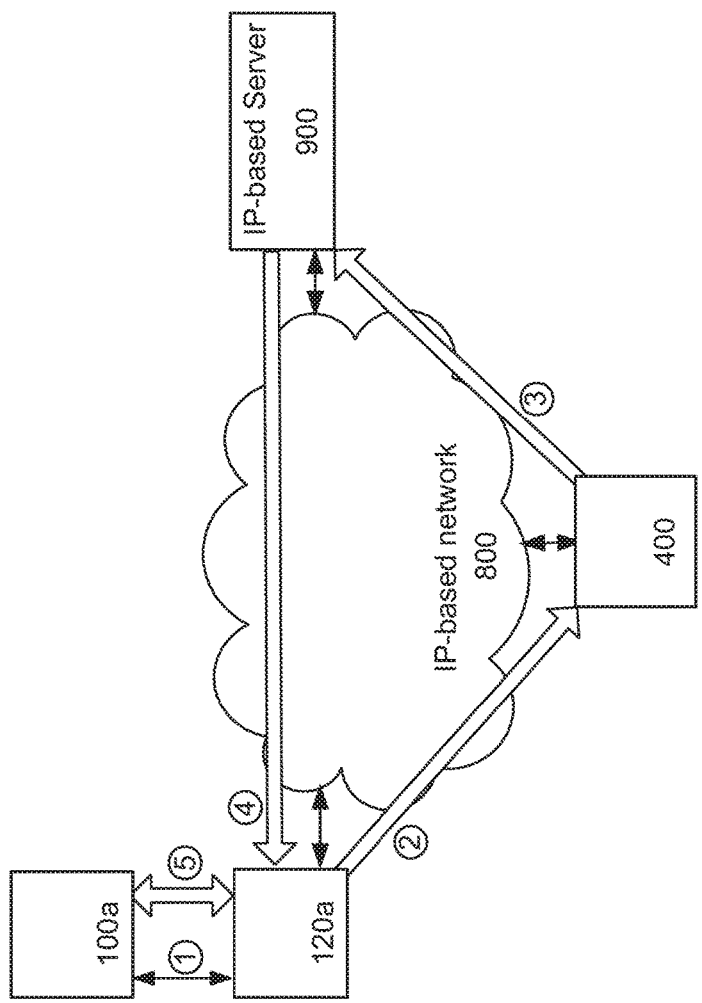

SYSTEM AND METHOD FOR DETECTING SURREPTITIOUS PACKET REROUTING

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2019, Michael Schloss.

FIELD OF THE TECHNOLOGY

The illustrative, illustrative, technology herein relates to systems, software, and methods for detecting surreptitious network traffic interception and redirection, and for taking action in response to a detected event. The technology has applications in the areas of computer and network operations and computer security.

BRIEF SUMMARY

Systems, methods, and computer-readable media are provided for detecting surreptitious redirection of computer network packets. In an embodiment, a computing device comprising a processor, memory, network interface, and operating system, and operably connectable to a computer network, the end user computing device further comprising a network packet redirection detection module configured to monitor IP packets transmitted over the computer network, may be configured to compare a metric related to a transit time of one or more of the IP packets between two routable IP addresses on the computer network to a historical record of the same metric for the two routable IP addresses on the computer network; and based upon a discrepancy identified between the metric and the historical record of the metric, determining that a redirection of IP network packet traffic has occurred on the computer network.

In an embodiment, a method for detecting surreptitious redirection of computer network packets is provided. The method may include monitoring, by a computing device, IP packets transmitted over a computer network; comparing a metric related to a transit time of one or more of the IP packets between two routable IP addresses on the computer network to a historical record of the same metric for the two routable IP addresses on the computer network; and based upon a discrepancy identified between the metric and the historical record of the metric, determining that a redirection of IP network packet traffic has occurred on the computer network. The methods and systems disclosed herein may be embodied in one or more devices, systems, computer-readable media that may be executed by one or more computer processors, or combinations thereof.

These and other aspects and advantages will become apparent when the Description below is read in conjunction with the accompanying Drawings.

BRIEF DESCRIPTION OF THE DRAWINGS

The features of the present technology will best be understood from a detailed description of the technology and example embodiments thereof selected for the purposes of illustration and shown in the accompanying drawings in which:

FIGS. 5a and 5b illustrate an illustrative message flow of normal and surreptitious packet rerouting in the IP based network in accordance with aspects of the described system.

DETAILED DESCRIPTION

Figure 1:
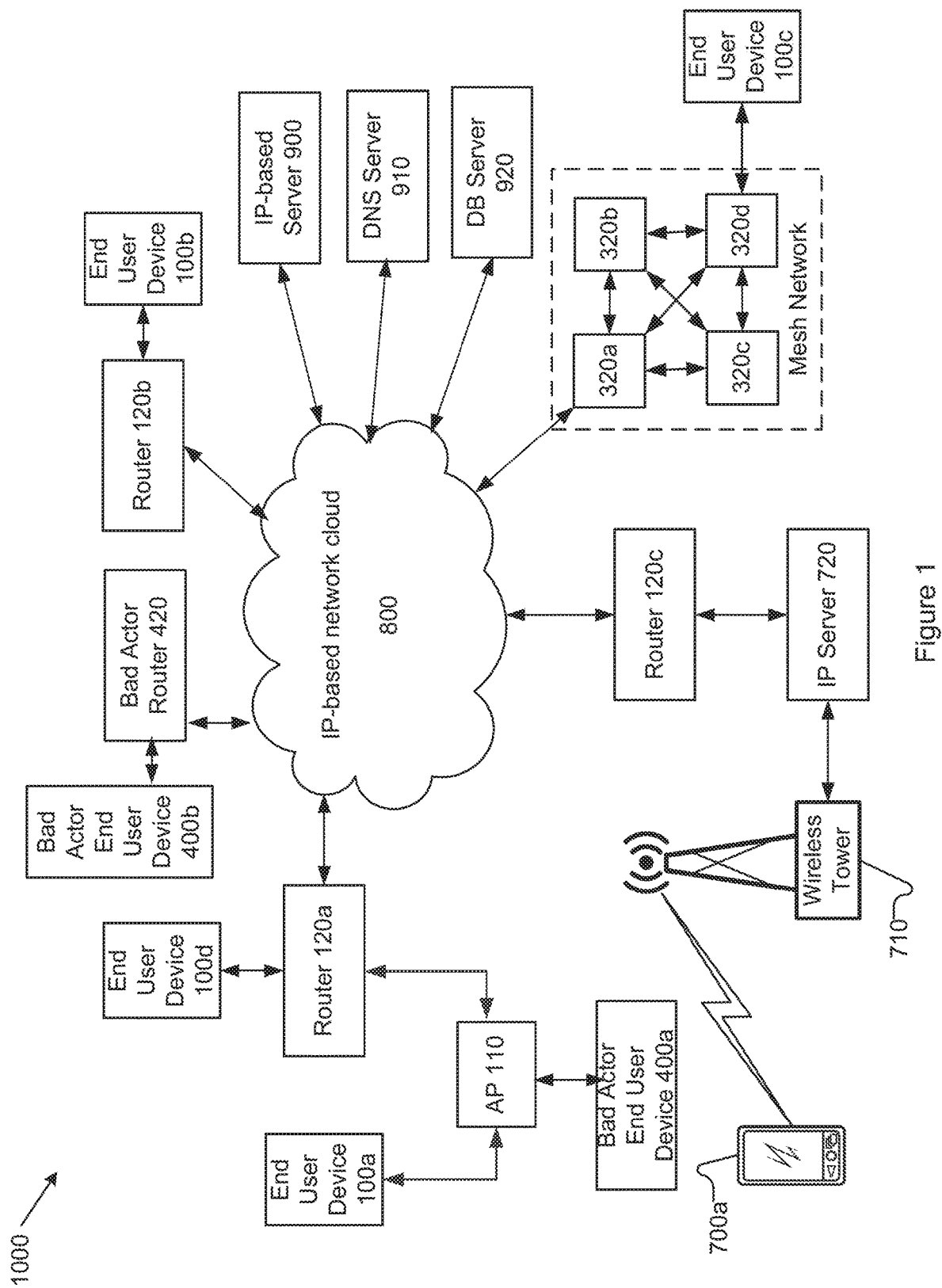
FIG. 1 illustrates an example IP based network.

The Internet is an IP-based network of wired and wireless computing devices that historically manages intra-device messaging traffic based upon dynamic packet routing principles in a quest for improved redundancy. These principles are embodied in the IP routing protocols (e.g. Border Gateway Protocol (BGP)), in the address resolution protocol (ARP) that map IP addresses to machine addresses on physical IP-based networks, and in the wireless access protocols for WiFi and cellular communications. Furthermore, as IP-based networks have trended toward increased network diversity in the last mile of connectivity, for example, using mesh networking technologies, the routes that the IP packets utilize have become increasingly complex and unpredictable. Unfortunately, these technological changes have introduced opportunities for "bad actors" to surreptitiously intercept network packet flows at the lower IP protocol layers and then compromise those packet flows. Network packet redirection attacks are historically performed surreptitiously. The dynamic nature of IP packet routing makes detecting these types of attacks challenging.

End user devices and other devices on the edge of large scale networks often do not have visibility into the routing mechanics of the network packet flows. In some cases, where one or both of the packet flow endpoints are located behind NAT-based firewalls, the actual device endpoints of the packet flow are not provided as part of the packet information. These constraints are based upon the design of IP routers, IP-based routing protocols, and NAT-based firewalls. Because of these limitations, these devices and networks need an independent method to determine if a network traffic flow has been inappropriately redirected and if so, to take actions to counter these redirections.

Similarly, the end user devices may not have visibility into attacks against the lowest levels of the IP protocol, including layer 2 attacks against the ARP, and to spoofed WiFi access points and cellular towers (e.g. Stingray-style attacks). Often, the end user has limited visibility into these mechanisms.

One way to detect these types of attacks is to observe the characteristics of the network packet timing, particularly round-trip packet times between an end user device and a server on the IP-based network. A change in network packet timing outside of standard error thresholds (either much faster or much slower) is indicative of a possible network packet redirection (e.g. an anomaly), although this approach may generate many false positive results. These false positive results may be caused, in part, by the dynamic nature of IP routing, IP-based network content caching schemes, or by other causes. A technical method of automatically determining whether a positive indication may be indicative of a network packet redirection attack is needed.

Systems and methods for detecting and remediating packet redirection attacks that are being perpetrated against a network packet stream are needed. These and other aspects and advantages will become apparent when the Description below is read in conjunction with the accompanying Drawings.

As used herein, Network Address Translation (NAT) refers to protocols and techniques used to translate network addresses between private and public address space(s), as the term is commonly used in the art. The terms Internet Protocol (IP), including IPv4 and IPv6, Transmission Control Protocol (TCP), and User Datagram Protocol (UDP), TCP/IP, and UDP/IP will be understood to have the meanings generally understood in the art. It will also be recognized that these and other protocols and techniques may use "packets" for communication, which are blocks of data transmitted across a network from a sending computer to one or more receiving computers, as known in the art. Similarly, a "sent packet stream" refers to a set of packets sent from a sending computer to a receiving computer, and a "return packet stream" refers to a set of packets sent from the receiving computer to the sending computer in response to received packets. A "packet stream" may include one or more sent and return packet streams.

As used herein, an "opaque network" refers to a network or subnetwork for which the packet routing is not known to an endpoint device.

As used herein, a "timing anomaly" refers to an end-to-end or round trip packet time that is greater or less than a baseline metric packet trip time. In some cases, the round-trip packet time may be considered a timing anomaly only if it differs from the baseline metric by a threshold amount.

Illustrative embodiments disclosed herein may use a combination of learning technologies and knowledge of IP-based (IPv4, IPv6, and successors) networking to determine if a network packet stream has been surreptitiously redirected. Furthermore, the technology needs to operate without interfering with existing IP-based technologies and have the ability to take specific defined actions when a network packet stream is suspected of having been redirected.

FIG. 1 shows an example IP based network (1000) suitable for use with embodiments disclosed herein, or within which embodiments disclosed herein may be implemented. An illustrative network structure includes an end-user device (100a), wirelessly connected to a wireless access point (AP) (110), which is in turn operably connected to an edge router (e.g. 120a) that provides connection to and between local systems (often having unroutable IP addresses), which is in turn operably connected to the IP-based network "cloud" (800) such as the Internet, which is in turn operably connected to an IP-based network server (900) (e.g. such as a webserver or other Internet-based server), or directly or indirectly to other end user devices (e.g. 100a, 100b, 100c, 100d). Each of the operable connections is made using routers, switches, telecommunications circuits, and similar networking equipment as will be known to and readily understood by one skilled in the art.

An illustrative corporate network device (100b) may be operably connected to a corporate edge router/firewall (120b), which is operably connected to the IP-based network "cloud" (800). Furthermore, another example end user device (100c) may be operably connected to a mesh network, which is operably connected to a plurality of other devices comprising the mesh network (320a-320d), at least one of which is operably connected to the IP-based network "cloud" (800). The commercial IP-based cloud (details not shown for clarity) may includes one or more routers, switches, and telecommunications circuits operably connected in order to move packets from an ingress router to an egress router, or between an ingress router and an edge caching device.

An illustrative IP-based network cloud (800) is the commercial Internet backbone as provided by ISPs and network providers such as Level 3, Verizon, and others. Within the IP-based cloud, support services such as an edge caching device (not shown), such as those provided for commercial content distribution networks (CDNs). Additionally, one or more Domain Name System (DNS) services (910) are provided hosted on one or more IP-based network servers operably connected to the IP-based cloud using the protocols and techniques well known to those skilled in the art. In some embodiments, a network attached database server (920) is provided and is operably connected to the IP-based network cloud, and is used as described below to provide a database of route metrics.

The router components of IP-based network cloud and the edge routers (e.g. 120a, 120b, 120c, and 320a-320d) manage routing the packets of the packet stream from an end user device to the IP-based server (900) and back again.

An illustrative packet of a packet stream is sent from an end-user device over the air (wirelessly) to the wireless access point (110), which in turn forwards the packet to the edge router (120a), which in turn forwards the packet to a router (not shown) in the IP-based network "cloud" (800). The packet is subsequently forwarded between routers in the IP-based network cloud until it reaches the IP-based network server (900). The response packet is sent by the IP-based network server to the IP-based network "cloud", forwarded between routers until it reaches the edge router to which the end user device is connected, which then forwards the packet to the end user device, which receives and processes the packet.

In some cases, a "bad actor" end user device (400a) and (400b) may be operably connected to the network, either to the wireless access point or via a "bad actor" router (420). In this example architecture, a bad actor end user device (400a) is wirelessly connected to the wireless access point (110) to conduct ARP spoofing, and bad actor end user device 400b is connected to a bad actor edge router (420) to conduct BGP hijacking.

Similar connection techniques may be used for cellular technologies. In the example diagram, end user device (700a) (a mobile phone) is in wireless communication with a wireless carrier transceiver/tower (710). Cellular telephony is not an IP-based network, so IP packet traffic on cellular telephony networks is tunneled over cellular telephony protocols such as GPRS. This tunneled traffic is routed to an IP server (720), where it is unencapsulated and transmitted to an edge router (120c) and then on to an IP-based network cloud and eventually its destination IP address (e.g. an IP-based network server such as server 900). Return IP packets flow back to the end user device (700), being encapsulated for tunneling over the cellular telephony network by the IP server (720). These packet flows may be measured in the same way as other IP packet flows, and in addition, the end user device 700 to wireless tower transmission/receipt time is embedded in the cellular telephony protocol and provide the time of flight. This time of flight, along with the database that tracks transmission times, can be used to detect "rogue" cellular towers.

One or more databases that store detailed or summary packet transmission and round trip time measurements and statistics may be incorporated into embodiments disclosed herein. Such databases may store packet transmission time information associated with a pair of IP addresses (e.g. a transmission time between source IP address and destination IP address), along with statistical information of the normal variance of the transmission time to account for the standard "jitter" in these transmission times. Statistical and/or fixed value upper and lower limits, collectively the thresholds for the pair of addresses, may also be stored to indicate when packets have taken too short or too long a time in transit. For example, a limit of one standard deviation about the mean transmission time may be used as a statistical threshold. As another example, a lower limit of 1 ms, 2 ms, 3 ms, or any other suitable time period and an upper limit of 8 ms, 9 ms, 10 ms, or any other suitable time period may be defined as fixed thresholds. In some embodiments, fixed limits may be used based upon known or expected packet routings. For example, it may be known, based on prior network behavior measured and/or stored in a system as disclosed herein, generally will be responded to in under 1 second, while redirected packet traffic may take at minimum 1.5 seconds for a response because the traffic has been routed overseas. In this example, a fixed upper limit of 1.25 seconds may be used. Lower limits may be used to detect redirection to another server that is closer to the end user device than expected. Other information may be stored in the database, such as defined actions to be taken in the event of a suspected redirection.

In an embodiment, a network-connected database may be used, hosted on a database server connected to the IP-based network cloud. The database may include local file storage, where the file system includes the data storage and indexing scheme, a relational database, such as those produced commercially by the Oracle Corporation or MySQL, an object database, an object relational database, a NOSQL database such as commercially provided MangoDB, or other database structures such as indexed record structures. The database may be stored solely within a single persistent memory, or may be stored across one or more persistent memories, or may even be stored in persistent memories on different computers.

A copy of the database, or a cache of database items, may be stored locally on the end user and routers of the described technology.

IP-based networks rely upon DNS servers to translate Uniform Resource Identifier (URI) host names into IP addresses. Redirection of DNS queries may be detected using the techniques described herein.

Content distribution networks (CDNs) are IP network-based servers that provide caching of content near the requesting end user device. CDN servers generally have unique IP addresses, so the techniques described herein can detect redirected packet streams to a CDN server and be able to determine the normal response/transmission times. Unlike other servers, the response time provided by a CDN or cache server is dependent upon whether the desired content is found within the CDN or cache, or if the request must be forwarded to another IP-based network server. Note that because the request from the CDN/cache is forwarded opaquely to the requesting end user device, the response/transmission time for packets routed to a CDN/cache may vary significantly. The database mechanism described above supports an IP address by IP address jitter value, which may be set to a large number to account for the varying packet flows. A similar approach may be used to account for content that is mirrored on multiple IP-based servers, where the packet stream path to the servers may vary opaquely to the end point device. This occurs when the mirrored servers are behind a load-balancing device that opaquely routes IP message traffic to one of a plurality of IP-based server(s).

End user devices (e.g. 100a, 100b, 100c, 100d, etc.), IP-based network connection point routers (e.g. 120a, 120b, 120c), and routers in the IP-based network cloud, can be configured for use in accordance with embodiments disclosed herein to identify network traffic flowing between an end user device and an IP-based network server. Using the systems and techniques disclosed herein, some or all of the devices may establish a historical average packet round trip time from the network packets sent by the end user device to the IP-based network server and the corresponding response packets. Sent packets may be matched to packets received, with the match being made using fields in the TCP/IP packets. For example, TCP/IP sequence numbers or other information within the TCP/IP packets themselves may be used to match sent and received packets. Alternatively or in addition, the time difference between when a packet was sent and the corresponding response may be calculated and used to identify corresponding packets.

Alternatively or in addition, packet responses may be matched in an application program and round-trip times computed at the application layer instead of within the IP stack such as is performed by IP protocols such as the network time protocol. However, in some configurations the network time protocol may not be able to detect BGP hijacking because the packet flow to and from the time server does not follow the same routing as traffic to other IP-based network servers.

Each of these calculation methods produces a packet round-trip time. Multiple packet round trip times may be statistically summarized using, for example, mean, mode, standard deviation, and "moving" metrics, to provide insights into the reliability and repeatability of the packet stream and its routing path. These statistical metrics may be used to provide a first indicia as to whether packets have been surreptitiously diverted—if the round-trip packet time unexpectedly increases beyond a specified limit value, the packet may have been surreptitiously diverted and further action may be required. The actual transmission times and the calculated summary information may be stored in a database (either local or network) for subsequent use in determining the status of future packets. This permits the system to "learn" about network changes that occur in the ordinary course of operating the network.

There are numerous reasons that packet round-trip time between a pair of endpoints may change during normal operation. For example, the packets may encounter congestion at one of the routers. As another example, packets may be routed differently (but are not meaningfully diverted) as part of the telecommunications network that makes up the IP-based network changes. For example, a telecommunications link may fail or become congested and the packets are automatically routed onto a backup telecommunications link. This happens regularly in large scale IP-based networks such as the Internet where the network is functioning properly so that the packets are automatically rerouted and delivered to their destination endpoint. The effect upon packet transmission times is called "jitter," and is characterized by some packets taking longer amounts of time and some packets taking shorter amounts of time to traverse between two endpoints. Embodiments disclosed herein may distinguish between alternatively routed and surreptitiously diverted packets using the discrimination techniques described below.

As another example, a packet round trip time may change due to an endpoint changing physical location. For example, the location of one of the endpoints may change when the endpoint is connected to the IP-based network using a different wireless access point or cellular tower. The packets thus take a different routing, and may traverse between endpoints more slowly or more quickly than previously measured. Embodiments disclosed herein may distinguish between alternatively routed and surreptitiously diverted packets using the discrimination techniques described below.

In an embodiment, the packet flow timings may include the amount of time required for the receiving server to process the packet, which contaminates the resulting round-trip timing metric with the processing time. During periods of high server load (e.g. an online retail server on "cyber Monday"), the round trip packet timing may be distorted beyond the control limits.

In some configurations, endpoints may not be accurately identified due to the nature of the IP network address assignments and various networking approaches utilizing dynamic addressing and protocols such as Network Address Translation (NAT), which may increase the difficulty of obtaining accurate metrics.

Dynamic addressing is commonly used; a mobile endpoint is assigned an IP address when it connects to a wireless access point or a cellular network using a protocol such as DHCP. This address is often not a routable IP address, being assigned from a pool of locally defined IP addresses that are not routable. NAT maps a locally defined address to a routable IP address, often at an edge router (e.g. FIG. 1, 120a, 120c). When this happens, the end user system does not know the IP address that it uses on the IP-based network. If the system detects an anomalous condition, the system may probe the network to determine the effective IP address that is assigned to the system for use on the IP-based network (as opposed to the unrouteable local IP address assigned to the system) and use that IP address in its metrics comparisons. Probing for the effective IP address may be performed making a query to the edge router, or by the well-known technique of making a connection to a system beyond the edge router and determining the IP address presented during that connection request. Whatever method is used, the endpoint system is now in possession of its effective IP address, and may use that information in its subsequent calculations. Note that the probing need only be performed periodically by the system, as the effective IP address will not change while an IP session is maintained.

Alternatively or in addition, the system may determine the location of the endpoint device using external means (such as GPS or cell tower triangulation). This location may be mapped to a location that is used to determine an appropriate effective IP address, for example if one cannot be otherwise determined.

It may be difficult to accurately identify endpoints when a service is provided by one or more geographically separated IP-based network servers. In this case, the routes of the packets to each of these servers will vary, resulting in varying packet round trip times. In most cases, each of these geographically separated servers will be identified by different effective IP addresses, and the methods described herein will operate normally. In some cases, such as opaque IP-network hosting or packet routing arrangements, the servers will be located behind a common effective IP address, and the packet traffic will be routed differently within the opaque portion of the network, resulting in significant differences in packet round trip times. This will be reflected in large jitter times, and be compensated for by specifying larger than normal operational limits in the database.

It also may be difficult to accurately identify endpoints when a content provider provides some of their content using a content distribution network (CDN) or a local IP-based network cache. CDNs improve overall IP-based network performance by caching some content close to the edge, and thus not requiring the session packets to traverse all the way to the content provider's server in order to obtain the desired content. According to embodiments disclosed herein, this may be determined based upon the presence of a relatively larger jitter time and may be compensated for by specifying larger than normal operational limits in the database.

Once accurate round-trip time metrics are determined for a session, it may become possible to determine if the current packet round-trip time is within one or more control limits. Generally, if the packet round trip time is within the control limits, no further action is required as the packet can be presumed to not have been surreptitiously redirected.

As previously described, systems and methods disclosed herein may track the historical packet round trip times between two IP endpoints, and aggregates the packet round trip time metrics in a database. The database of endpoints and accumulated packet round-trip time metrics (and control limits) may be locally stored on a system, or may be stored on one or more network accessible servers, or shared between the two systems. On a periodic basis, the system may compare the current packet round trip time between a pair of IP endpoints to the current values stored in the database, and determines if the current packet round trip time is close enough to the stored metric (where close enough is defined by the control limits for that link). If the packet transmission time (or round trip time) is outside the defined limits, the system takes an action as defined for that specific endpoint pair (or for a network/subnet).

Figure 2:
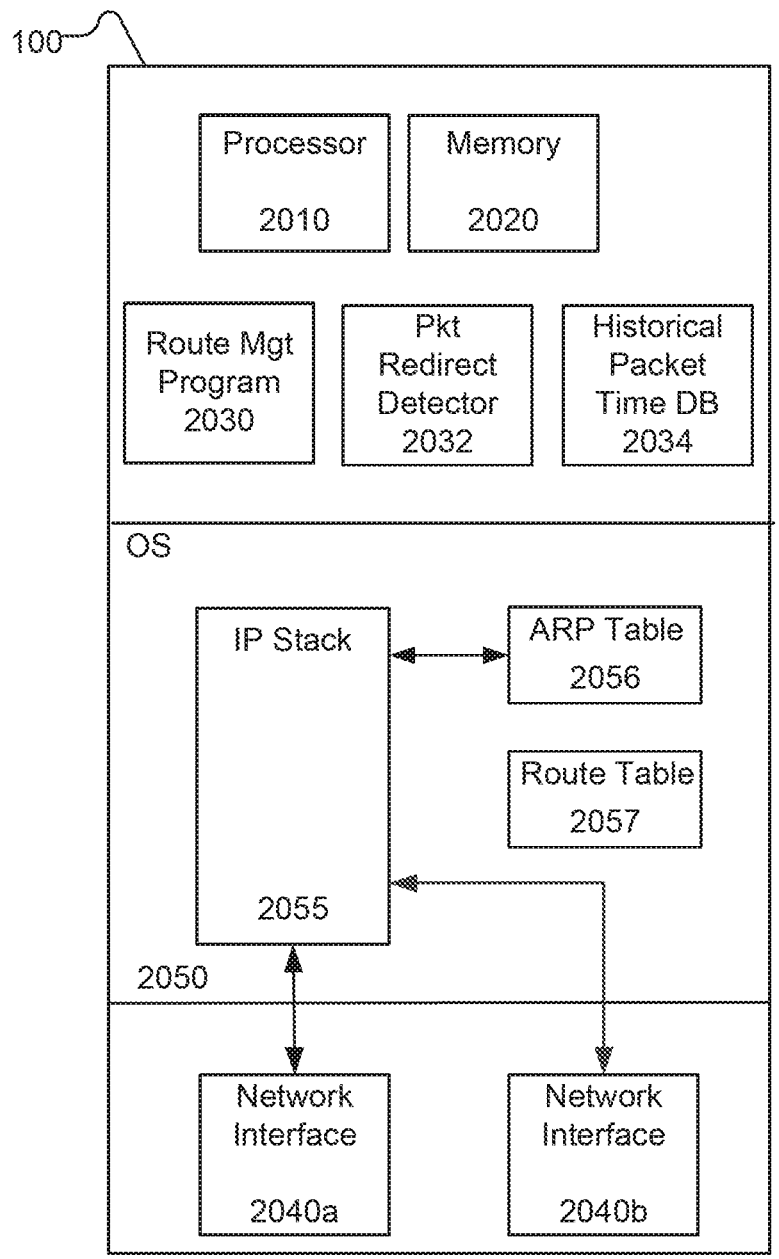
FIG. 2 depicts an illustrative systems diagram of an end user computing apparatus supporting aspects of the described system.

FIG. 2 illustrates an embodiment including an illustrative end-user device (100), which includes a processor (2010), persistent and transient memories (2020), hardware network interfaces (2040a, 2040b), operating system ("OS") (2050), and specialized application programs for IP route management (2030), packet redirection detection (2032), and a historical packet times database (2034). Included, either within the operating system or a standalone system, is an IP stack (2055), including IP protocol software (e.g. the IP stack), ARP table (2056), an interface/routing table (2057), a sent packet memory (part of memory 2020), and at least one network interface software (not shown) that interfaces to one or more of the network interface(s) (e.g. 2040a, 2040b). The IP protocol software updates and maintains the ARP table with Media Access Control (MAC)/IP address maps (e.g. the rows of the ARP table) that are used to convert between IP address and the low level network MAC address, and updates the interface/routing table using the IP address parameters of the network interface(s) (e.g., 2040a, 2040b). The illustrative end-user device further includes application programs (e.g. 2030, 2032, 2034) as described below that interface with the IP-based network server using the IP protocol via the IP stack, at least one network interface, and the network (not shown).

Each illustrative device may include one or more processors (of either general central processing units (CPU) or specialty processors such as field programmable gate arrays (FPGAs) and graphics processing units (GPUs)), operably connected to memories of both persistent and/or transient nature that are used to store information being processed by the system and to additionally store various program instructions (collectively programs) that are loaded and executed by the processors in order to perform the process operations described herein, further operably connected to networking and communications interfaces appropriate to the deployed configuration. The network interfaces may be operated under control of the processor and the processing instructions contained within the control and operating programs mentioned above. These interfaces provide a connection to wired and wireless networking products that operably connect the servers, data sources, and network services described herein. For purposes of clarity, each network interface is illustrated as a separate interface, but may be implemented as one or more interfaces if desired.

Examples of suitable persistent memories may include disk, programmable read only memory (PROM), electronically erasable programmable read only memory (EEPROM), flash storage, and related technologies characterized by their ability to retain their contents between on/off power cycling of the computer system. Some persistent memories may take the form of a file system for the server, and may be used to store control and operating programs and information that define the manner in which the server operates, including scheduling of background and foreground processes, as well as periodically performed processes. Persistent memories in the form of network attached storage (storage that is accessible over a network interface) may also be used without departing from the scope of the disclosure. Transient memories may include random access memory (RAM) and related technologies characterized by the aspect of the contents of the storage not being retained between on/off power cycling of the computer system.

Stored within persistent memories of the system may be one or more databases used for the storage of information collected and/or calculated by the server and read, processed, and written by the processors under control of the program(s). The device may also be operably connected to an external network database (e.g. database server 900, FIG. 1) via one or more network interfaces. The local database may be an instance of an external network database that is provided on another server.

The illustrative device may also include message notification and alerting programs (not shown), which facilitate inter-process and inter-server messaging and notification. These systems, such as operating system provided inter-process communication facilities (IPCs) and third party messaging middleware subsystems such as MQ from IBM. The server may also include utility program scheduling programs, such as "cron" on Unix systems or scheduled tasks on Windows systems, that are used to run specific programs on a periodic or scheduled basis.

The illustrative device also may support one or more programs for providing server management information (not shown for clarity) utilizing a web services interface or other dedicated management information reporting systems such as simplified network management protocol (SNMP) for purposes of providing management information useful to report on the operation of the server.

IP route management software (2030) may manage the route and interface table (2057) used by the IP stack. The IP stack uses this table to determine which network interface should be used to transmit packets based upon their destination IP address. The IP route management software monitors the route and interface table for changes, and if one is detected, takes an action as defined in the database. The IP route management software also interacts with the IP stack to monitor received ARP packets. If conflicting ARP packets are received, the software takes an action as defined in the database.

Packet redirection detection software (2032), which may implement techniques disclosed herein, may operate in two modes. It may perform application-level round trip timing to one or more IP addresses using a protocol like ping or traceroute, or a relatively simple service such as the echo service hosted on a remote IP-based server. These packet timings may be used to populate the historical packet database (2032) and/or be used to calculate current packet transmission time/response time metrics. In addition, the packet redirection detection software may interoperate with the IP stack in order to determine if packet redirection is occurring on other packet streams.

The Historical Packet Time database may be, for example, a local instance of the network database described above. It may function as a standalone database, or a cache of the network database. The database may include local file storage, where the file system includes the data storage and indexing scheme, a relational database, such as those produced commercially by the Oracle Corporation or MySQL, an object database, an object relational database, a NOSQL database such as commercially provided MangoDB, or other database structures such as indexed record structures. The database may be stored solely within a single persistent memory, or may be stored across one or more persistent memories, or may even be stored in persistent memories on different computers.

The packet matching approach may provide a relatively straightforward mechanism for establishing round-trip timing metrics for specific packet flows. However, in some cases such a mechanism may be insufficient to solely determine whether packets are being surreptitiously redirected as the round trip route times may vary during ordinary use. Additional discriminating characteristics of the packet route may be used to distinguish between "normal" packet round trip times and surreptitiously redirected packets.

In an embodiment, those packets which are not extensively processed by the endpoints may be identified their round trip times measured. One example of these types of packets include the packets that make up the TCP/IP "3-way handshake" that occurs during TCP/IP session setup. These packets are characterized by the use of the SYN flag in the packet header. The following packet flow typically is used to implement this handshake:

Host A sends a TCP synchronize packet (SYN) to Host B.
Host B receives A's SYN.
Host B sends a synchronize-acknowledgement (SYN-ACK).
Host A receives B's SYN-ACK.
Host A sends an acknowledge response (ACK).
Host B receives ACK.
TCP session connection is ESTABLISHED.

Since Host A and Host B process the 3-way handshake protocol packets at a low level of the IP stack, these processing times are generally less affected by server loads than processes running at the application level on the server. This approach mitigates the effects of server load on the packet round-trip timing.

Other packet matching schemes may include using the TCP/IP packet serial numbers to calculate the time from sending the packet until the corresponding ACK is received. By instrumenting the TCP/IP stack in this manner, the system can detect a packet stream diversion as soon as it occurs and take the prescribed action.

Another approach that may be used is to determine the packets that have internal time synchronization information included as part of a higher level protocol. Various clock-synchronization protocols, Real Time Streaming Protocol (RTSP), Real-time Transport Protocol (RTP) and the RTP Control Protocol (RTCP), and similar well-known IP-based communications protocols all share the characteristic of providing timestamps that can be used to provide an independent mechanism for determining packet transport times within a session. The RTP/RTCP protocols have the advantage of being able to function over TCP or UDP-based sessions (as opposed to operating strictly over TCP-based sessions described elsewhere), permitting the measurement of packet travel times over either TCP or UDP sessions.

All of these techniques may be used to individually, or in conjunction with one another to more accurately determine packet round trip times, ensuring that the round-trip times using to compute the current session metrics are accurate. The currently calculated packet time(s) may be written to the database or may be used to update the statistical information in the database.

In each case, a Packet Redirect Detection process as disclosed herein may compare the computed transmission or round-trip time metric against entries in the historical packet time database to determine if the computed value is within the control values defined in the database. If the computed value is outside of the control values, a remedial or other action may be taken as defined in the database entry for the IP address pair (source, destination).

For example, upon detection of a suspected redirection attack, the system may take one or more of the following actions:
  Disconnect from the network
  Terminate the IP session
  Stop current packet stream communications to/from a specific IP address or IP address range
  Stop future packet stream communications to/from a specific IP address or IP address range
  Reject the packet
  Reroute the packet stream for a specific IP address or IP address range to a known good router (by IP or or MAC address)
  Conduct a test to determine if the suspected attack is a false positive. For example, a test to determine false positives might include a "ping" or "traceroute" to determine if the packet delay (e.g. evidence of a suspected attack) was transitive, or might include monitoring continued packet flows to determine if the delay continues.
  Generate a message indicating the detected condition to another computer or process
  Generate a notification (e.g. email, text message, SNMP trap, user interface, UI popup)
  Log the detection details Taken together, a device as disclosed herein may perform the following steps to detect and respond to surreptitious packet redirection of TCP/IP streams:

1. Determine if the current IP address is routable or not. If not, determine the routable IP address that will be assigned to the packet.

2. Look up in the database the expected route, response times, and control limits for round trip packets between the source and destination IP addresses.

3. Calculate the sending time for the packet. Optionally store a packet ID (such as a sequence number) and the sending time in a database for later use.

4. Transmit the packet and save the packet serial number and start time in a memory.

5. Upon receipt of the response packet, look up the sending time for the original sent packet based upon matching the response packet to the send packet (either in the in-memory list of TCP/IP packets or in a database). The matching preferably occurs using TCP/IP header information such as packet serial numbers, sequence numbers, and TCP/IP ACKs. Optionally store the information about the received packet (e.g. received time) in a database for later use.

6. Calculate the round trip time for the TCP/IP stream packet flow.

7. Compare the calculated round trip time against the control limits for the packet stream endpoints.

8. If the calculated round trip time is outside the control limits (either too high or too low), take the actions specified in the database for these endpoints.

9. Update the database with the current packet calculated round trip time.

A similar approach may be used for UDP/IP and application level protocols using intrinsic information in the UDP packets and application level protocols (varies by protocol).

Figure 3:
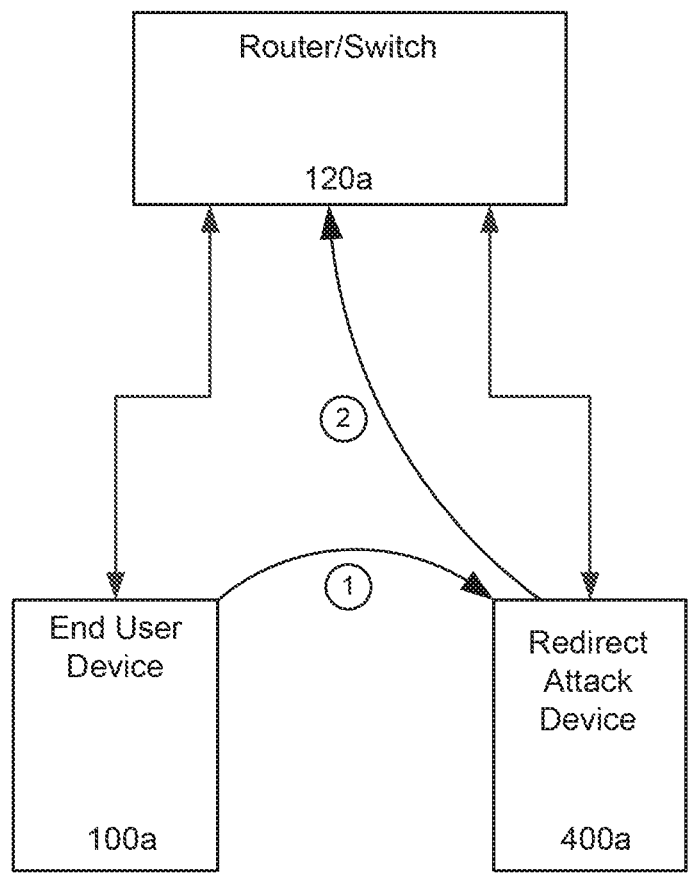
FIG. 3 illustrates an illustrative message flow of surreptitious packet rerouting in accordance with aspects of the described system.

FIG. 3 illustrates the results of an ARP redirection attack on a local network. Using an illustrative portion of the network described in FIG. 1, in normal use, an end user device (100a) may connect to a router or switch (e.g. router 120a) and route packets to that router for forwarding to other systems that are part of the IP-based network (not shown). As part of the low level protocol, the end user device may use the ARP to request and receive the MAC address of the router and stores that information in its ARP table (e.g. ARP table 2056, FIG. 2). In an ARP redirection attack, the redirect attack device (400a) (e.g. the bad actor) transmits a false ARP response message in response to the ARP request from the end user device. In this way, the redirect attack device pretends to be the router. If successful, packets from the end user device will be sent to the redirect attack device instead of the router (packet path 1 in FIG. 3). The redirect attack device may then copy or change the packet and then forward it on to the router for transmission to the IP-based network (the packet path 2 in FIG. 3). This type of attack may be employed against public wireless access points with great success, as the surreptitious ARP redirection provides no notice to the end user device or its user.

A Route Management Program (2030) of the end user device may detect these surreptitious attacks by detecting either changes to the ARP table itself, or by detecting a plurality of responses to the initial ARP request from the end user device. If an attack is detected, the route management program takes an action as described above.

The packet redirect detector functions as described above to detect surreptitiously redirected packets from opaque parts of the IP-based network, and if detected, takes a defined action as described above.

Figure 4:
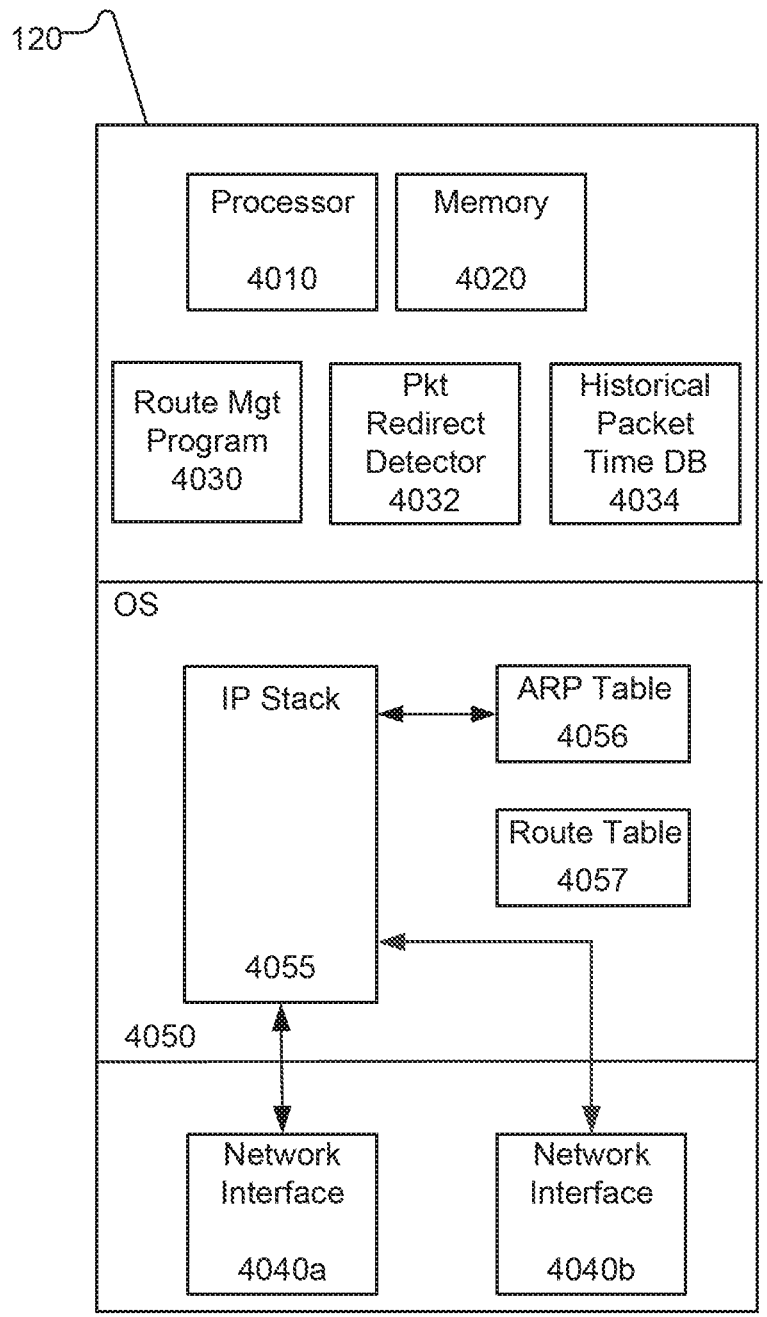
FIG. 4 depicts an illustrative systems diagram of a network equipment apparatus supporting aspects of the described system.

FIG. 4 illustrates an example router, such as an edge router (e.g. 120a) or one of the routers in the IP-based network cloud (not shown). The router device includes a processor (4010), persistent and transient memories (4020), hardware network interfaces (4040a, 4040b), operating system (4050), and specialized application programs for IP route management (4030), packet redirection detection (4032), and a historical packet times database (4034). The example router, if an edge router, may also include BGP, NAT, and/or firewall/packet filtering programs (not shown). Included, either within the operating system or a standalone system, is an IP stack (4055), including IP protocol software (e.g. the IP stack), ARP table (4056), an interface/routing table (4057), a sent packet memory (part of memory 2020), and at least one network interface software (not shown) that interfaces to one or more of the network interface(s) (e.g. 4040a, 4040b). The IP protocol software updates and maintains the ARP table with Media Access Control (MAC)/IP address maps that convert between IP address and the low level network MAC, and updates the interface/routing table using the IP address parameters of the network interface(s) (e.g., 4040a, 4040b). The illustrative router further may include application programs (e.g. 4030, 4032, 4034) as described below that interface with the IP-based network server using the IP protocol via the IP stack, at least one network interface, and the network (not shown).

Each illustrative device may include one or more processors (either general CPU or specialty processors such as FPGA and GPU), operably connected to memories of both persistent and/or transient nature that are used to store information being processed by the system and to additionally store various program instructions (collectively programs) that are loaded and executed by the processors in order to perform the process operations described herein, further operably connected to networking and communications interfaces appropriate to the deployed configuration. The network interfaces may be operated under control of the processor and the processing instructions contained within the control and operating programs mentioned above. These interfaces may provide a connection to wired and wireless networking products that operably connect the servers, data sources, and network services described herein. For purposes of clarity, each network interface is illustrated as a separate interface, but may be implemented as one or more interfaces if desired.

Suitable forms of persistent memories may include disk, PROM, EEPROM, flash storage, and related technologies characterized by their ability to retain their contents between on/off power cycling of the computer system. Some persistent memories may take the form of a file system for the server, and may be used to store control and operating programs and information that define the manner in which the server operates, including scheduling of background and foreground processes, as well as periodically performed processes. Persistent memories in the form of network attached storage (storage that is accessible over a network interface) may also be used without departing from the scope of the disclosure. Transient memories may include RAM and related technologies characterized by that the contents of the storage are not retained between on/off power cycling of the computer system.

Stored within persistent memories of the system may be one or more databases used for the storage of information collected and/or calculated by the server and read, processed, and written by the processors under control of the program(s). The device may also be operably connected to an external network database (e.g. database server 920, FIG. 1) via one or more network interfaces. The local database may be an instance of an external network database that is provided on another server.

The illustrative device may also include message notification and alerting programs (not shown), which facilitate inter-process and inter-server messaging and notification. These systems, such as operating system provided inter-process communication facilities (IPCs) and third party messaging middleware subsystems such as MQ from IBM. The server may also include utility program scheduling programs, such as "cron" on Unix systems or scheduled tasks on Windows systems, that are used to run specific programs on a periodic or scheduled basis.

The illustrative device also may support one or more programs for providing server management information (not shown for clarity) utilizing a web services interface or other dedicated management information reporting systems such as SNMP for purposes of providing management information useful to report on the operation of the server.

IP route management software (4030) manages the route and interface table (4057) used by the IP stack. The IP stack uses this table to determine which network interface should be used to transmit packets based upon their destination IP address. The IP route management software monitors the route and interface table for changes, and if one is detected, takes an action as defined in the database. The IP route management software also interacts with the IP stack to monitor received ARP and BGP packets. If conflicting ARP or BGP packets are received, the software takes an action as defined in the database.

ARP packets are processed as described above. When BGP packets are received, the router compares the indicated IP address (or IP address range) against the IP address of the BGP packet source to determine if the BGP route and the IP address(es) identified for rerouting by the BGP packet are in the same general geographic area. IP address ranges are assigned by geographic location and the current assignments are stored in a network database maintained by one or more network managers. If the originating BGP packet's IP address and rerouted IP addresses do not match geographically, the BGP packet may be rejected and the router will take an action as described in this document.

Packet redirection detection software (4032) may operate in two modes. It performs application-level round trip timing to one or more IP addresses using a protocol like ping or traceroute, or even a service such as the echo service hosted on a remote IP-based server. These packet timings may be used to populate the historical packet database (2034) and/or be used to calculate current packet transmission time/response time metrics. In addition, the packet redirection detection software interoperates with the IP stack in order to determine if packet redirection is occurring on other packet streams.

Unlike end user devices, routers other than edge routers generally do not receive and process TCP/IP stream ACKs. Edge routers (which often include a firewall component) can inspect the network packets for timestamps as described above. Alternatively, an edge router may retain packet message numbers for TCP/IP packet streams and calculate the round trip packet times as described above.

The Historical Packet Time database (4034) is a local instance of the network database described above. It may function as a standalone database, or a cache of the network database. The database may include local file storage, where the file system includes the data storage and indexing scheme, a relational database, such as those produced commercially by the Oracle Corporation or MySQL, an object database, an object relational database, a NOSQL database such as commercially provided MangoDB, or other database structures such as indexed record structures. The database may be stored solely within a single persistent memory, or may be stored across one or more persistent memories, or may even be stored in persistent memories on different computers.

FIGS. 5a and 5b describe a standard packet flow between an end user device and an IP-based server over an IP-based network, and then describe the same packet flow over an IP-based network where the router has been subjected to a BGP hijack attack, respectively.

In FIG. 5a, the end user device (100a) sends packets to an edge router (120a) as shown by packet flow 1. The edge router forwards the packets to the IP-based network, which in turn forwards the packets to the IP-based server (900) as indicated by packet flow 2. The IP-based server sends a return packet to the edge router (packet flow 3), which is then forwarded to the end user device (100a) (packet flow 4). Each of the devices shown may incorporate the invention to monitor the packet flow and detect whether surreptitious network traffic redirection has occurred.

In FIG. 5b, the end user device (100a) sends packets to an edge router (120a) (packet flow 1) which has been the subject of an undetected BGP attack by a "bad actor" device (400). The BGP attack includes a BGP protocol packet sent from the bad actor device to the edge router, naming the bad actor device as the router for the IP-based server. The edge router is not currently operating with the technology described herein, so the BGP packet is accepted and the route table updated to redirect packet traffic to the IP-based server to the bad actor device. Upon receipt of the packet from the user device, the edge router forwards that packet to the bad actor device (packet flow 2), which then forwards the packet to the IP-based server (packet flow 3). The IP-based server processes the received packet, and sends a response back to the edge router (packet flow 4), which then forwards the response packet to the end user device (packet flow 5).

In this example, the user device 100a is operating according to embodiments described herein and detects that the packet round trip time has increased due to the redirection. At that point it may take an action as indicated in the database, or other suitable action defined in the system.

As another example, if the edge router had been operating using the methods disclosed herein, the erroneous BGP packet (the attack packet) would have been detected and an action taken upon receipt, which would also have blocked the attack.

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and implementations where it is desirable to monitor, detect, and take action in response to surreptitious network packet redirection. Accordingly, the claims set forth below should be construed in view of the full breadth and spirit of the technology as disclosed herein.

I claim:

1. A system:
    a computing device comprising a processor, memory, network interface, and operating system, and operably connectable to a computer network, the computing device further comprising a network packet redirection detection module configured to monitor IP packets transmitted over the computer network,
    wherein the computing device is configured to:
    within a session between a source computer and a destination computer, compare a packet transmission time or a round trip time of one or more of the IP packets between a source IP address assigned to the source computer and a destination IP address assigned to the destination computer on the computer network to a historical record of one or more packet transmission times or round trip times between the source IP address and the destination IP address on the computer network; and
    based upon a discrepancy identified between the packet transmission time or the round trip time and the historical record of the one or more packet transmission times or round trip times, determining that a surreptitious redirection of IP network packet traffic has occurred on the computer network.

2. The system of claim 1, wherein the network packet redirection detection module determines an effective sending IP address for a system having an unroutable IP address.

3. The system of claim 1, wherein the network packet redirection detection module is configured to monitor TCP/IP streams for packet transmission time anomalies and/or round trip packet response time anomalies.

4. The system of claim 3, further comprising a database containing the historical record of the one or more packet transmission times or round trip times between the source IP address and the destination IP address.

5. The system of claim 1, where the computing device executes an IP networking stack that causes the network interface to transmit and receive UDP/IP packets.

6. The system of claim 5, where the network packet redirection detection module is configured to monitor UDP/IP packet transmission and receipt times to identify packet transmission time anomalies.

7. The system of claim 6, further comprising a database containing historical packet transmission and receipt times between mutable IP addresses.

8. A method comprising:
    monitoring, by a computing device, IP packets transmitted or received over a computer network;
    within a session between a source computer and a destination computer, comparing a packet transmission time or a round trip time of one or more of the IP packets between a source IP address assigned to the source computer and a destination IP address assigned to the destination computer on the computer network to a historical record of one or more packet transmission times or round trip times between the source IP address and the destination IP address on the computer network; and
    based upon a discrepancy identified between the packet transmission time or the round trip time and the historical record of the one or more packet transmission times or round trip times, determining that a surreptitious redirection of IP network packet traffic has occurred on the computer network.

9. The method of claim 8, further comprising determining that a sending computer system has an unroutable IP address, and determining a routable sending IP address for the sending computer system having the unroutable IP address.

10. The method of claim 8, wherein the discrepancy comprises one or more round trip packet response time anomalies.

11. The method of claim 8,
    wherein the historical record comprises historical packet transmission times between the source IP address and the destination IP address, and
    wherein the discrepancy comprises a difference between the packet transmission time or the round trip time between the source IP address and the destination IP address and the historical record of the one or more packet transmission times or round trip times between the source IP address and the destination IP address.

12. The method of claim 11, further comprising determining that the difference is not within an acceptable range of times.

13. The method of claim 8, wherein the monitoring comprises monitoring UDP/IP streams for packet transmission time anomalies, by comparing a timestamp or other timing indicia contained within the packet to a current system time and calculating the packet transmission time.

14. The method of claim 13, wherein the packet transmission time or the round trip time is the calculated packet transmission time and the historical record of the one or more packet transmission times or round trip times is a historical packet transmission time.

15. The method of claim 14, wherein the discrepancy comprises a difference between the calculated packet transmission time and the historical packet transmission time that is not within an acceptable range of times.

16. The method of claim 8, further comprising taking a predefined action in response to the discrepancy.

17. The method of claim 16, where the taken predefined action is one or more actions selected from a group consisting of:
    disconnecting from the network;
    stopping IP transmissions to the destination IP address;
    dropping a packet;
    conducting a further test;
    generating a notification;
    generating a message to another computer or process;
    generating a log message; and
    redirecting one or more packets to a known-good router.

18. The method of claim 8, further comprising monitoring the IP packets received for an anomalous ARP response, and taking an action in response to an anomalously received ARP response.

19. The method of claim 18, where the taken action is one or more actions selection from a group consisting of:
    disconnecting from the computer network;
    stopping IP transmissions to a destination IP address;
    dropping a packet;
    conducting a further test;
    generating a notification;
    generating a message to another computer or process;
    generating a log message; and
    redirecting one or more packets to a known-good router).

20. A non-transitory computer-readable medium storing a plurality of instructions which, when executed by a computer processor, execute a method for detecting surreptitious redirection of computer network packets, the method comprising:
    monitoring, by a computing device, IP packets transmitted over a computer network;
    within a session between a source computer and a destination computer, comparing a packet transmission time or a round trip time of one or more of the IP packets between a source IP address assigned to the source computer and a destination IP address assigned to the destination computer on the computer network to a historical record of one or more packet transmission times or round trip times between the source IP address and the destination IP address on the computer network; and
    based upon a discrepancy identified between the packet transmission time or the round trip time and the historical record of the one or more packet transmission times or round trip times, determining that a surreptitious redirection of IP network packet traffic has occurred on the computer network.

* * * * *